United States Patent [19]

Watson

[11] 4,187,882
[45] Feb. 12, 1980

[54] DIVERTER-VALVE APPARATUS

[76] Inventor: John D. Watson, 906 E. Harmony La., Fullerton, Calif. 92631

[21] Appl. No.: 935,028

[22] Filed: Aug. 18, 1978

[51] Int. Cl.[2] .......................................... F16K 11/085
[52] U.S. Cl. .............................. 137/625.47; 137/563; 137/876; 239/127
[58] Field of Search .................. 137/563, 625.47, 876; 239/127

[56] References Cited

U.S. PATENT DOCUMENTS

| 967,460 | 8/1910 | Straub | 137/625.47 X |
|---|---|---|---|
| 1,774,685 | 9/1930 | Vickers | 137/625.47 X |
| 2,095,064 | 10/1937 | Harper | 137/625.47 X |
| 3,784,100 | 1/1974 | Kirschmann | 239/127 X |
| 3,939,871 | 2/1976 | Dickson | 137/625.47 |
| 4,129,150 | 12/1978 | Boisserand | 137/563 X |

Primary Examiner—Gerald A. Michalsky
Attorney, Agent, or Firm—Francis X. LoJacono

[57] ABSTRACT

A diverter valve apparatus for the control of fluid flow and pressure within a high-pressure fluid system, wherein the system includes a plurality of fluid devices and a related number of diverter valves, each being fitted with an internal bypass orifice in its return port, which simulates the operating pressure drop through the fluid device controlled by the respective diverter valve. The diverter valve includes a shaft gate having a porting passage located therein, so that as the gate is rotated from the ON toward the OFF position the porting passage to the outlet port is reduced.

4 Claims, 5 Drawing Figures

DIVERTER-VALVE APPARATUS

BACKGROUND OF THE INVENTION

1. Field of the Invention

This invention relates generally to fluid-flow-control valves and, more particularly, to a diverter-valve apparatus for use in high-pressure fluid systems having more than one operating fluid device, so as to continuously provide equalized pressure within the overall system when closed or momentarily blocked.

2. Description of the Prior Art

As is well known in the art, various problems and difficulties are encountered in providing a suitable means for controlling high-pressure surges within a fluid-pressure system.

That is, there are many types of control valves used in fluid systems, including two-way valves which provide on-and-off control of fluid devices; three-way valves which provide the option of operating either of two fluid devices, but not both devices simultaneously; and four-way valves which provide for operation of a fluid device such as a hydraulic cylinder in either of two directions, while also directing the return fluid flow through the valve to the system reservoir.

In each of these types of valves, the valve has a neutral or null position through which it must pass wherein fluid flow from the pressure source is at least momentarily blocked. In a system using a positive displacement pump, the action of such valves results in an extremely high momentary pressure surge which can damage pump parts, fittings, lines, etc. Sophisticated hydraulic systems include pressure regulators, or self-regulating variable flow pumps and accumulators to accommodate these conditions. However, a simple system, such as is used for water blasting, has a fixed positive displacement pump protected only by a pressure-relief valve. A pressure-relief valve is designed only to accommodate low rates of fluid flow, and cannot respond rapidly enough to prevent overpressuring of a high-flow system under condition of momentary flow blockage.

Flow dividers also exist which accept a given inlet fluid flow and divide this flow equally or at a predetermined ratio between two fluid devices. These characteristics are predetermined by the design of the flow divider, and do not allow for shutting off fluid flow to one fluid device independently of the other fluid device.

Several known fluid-control valves are disclosed in the following United States patents.

U.S. Pat. No. 1,240,586 is a typical cock valve having a tapered plug to regulate the fluid flow through a single inlet passage to dual outlet passages.

U.S. Pat. No. 1,807,085 discloses a two-way-valve device, whereby fluid from a single conductor may be delivered to either or both of a pair of diverging distributors.

A fluid-flow-control fixture is disclosed in U.S. Pat. No. 1,807,900 that is especially designed for use in connection with wash bowls, sinks, laundry trays, etc.

A selector valve is also disclosed in U.S. Pat. No. 3,536,101 which is particularly adapted for marine and industrial applications, wherebgy the valve must often have to withstand not only high-pressure surges, but abrasion and clogging from semi-solid materials entering along with the fluid.

However, what is needed is a diverter valve that allows one fluid device to be shut off, without affecting the fluid flow directed to another fluid device or affecting the pressure within the complete fluid system.

SUMMARY OF THE INVENTION

The primary purpose of the diverter-valve apparatus is to provide a means of operating and individually controlling each of a plurality of pressure and flow-dependent fluid devices operating from a single fluid-pressure source, without significantly affecting the pressure and flow delivered to the other fluid devices.

The controlling of the fluid pressure within a given system is accomplished by installing the present invention (diverter valve) in the line from the pressure source to each fluid device to be controlled. With the diverter valve in the ON position, fluid flows freely to the fluid-discharge device. Moving the diverter-valve-control handle to the OFF position cuts off fluid flow to the fluid-discharge device—and thus diverts fluid to the fluid reservoir in a continuous manner, without interruption and without significantly changing the pressure or flow characteristics of the pressurized fluid supplied to the other fluid devices within the pressurized fluid system.

Fluid under pressure is supplied by a single motor-driven pump or other suitable pump source through a manifold system, providing several fluid discharge or operational devices to be accommodated within the system, wherein diverter valves are positioned between each discharge device and pump, and whereby fluid under pressure flows first through each diverter valve prior to entering its associated fluid device. Thus, the fluid pressure supplied to all fluid devices is equal as a function of the cumulative pressure drop in the entire system; and the fluid flow to each fluid device is a function of the demand of that individual device at the existing pressure.

Each diverter valve is fitted with an internal bypass orifice located in its bypass return port whereby the arrangement of the bypass orifice is such that it simulates the operating pressure drop through the associated fluid device controlled by the particular diverter valve. The diverter valve further includes a cock gate having an eccentrically disposed passage offset to the normal flow of fluid from the aligned concentric inlet and outlet ports of the valve body. Thus, the cock gate can be rotated to an OFF position and still provide an overlapping of the ports by the plug's passage and the bypass outlet, whereby fluid will be allowed to flow through the bypass outlet prior to the main outlet port being completely closed off. This provides a substantially continuous normal pressure flow of fluid within the system during the movement of the cock gate, wherein further rotation of the plug closes the outlet port and opens the bypass outlet for full communication with the pressurized fluid flowing from the open inlet port, allowing fluid to return to the reservoir.

OBJECTS AND ADVANTAGES OF THE INVENTION

The present invention has for an important object a provision wherein the primary purpose of the diverter-valve apparatus is to provide a means of operating and individually controlling each of a plurality of pressure and flow-dependent fluid devices operating from a single fluid-pressure system, without significantly affecting the pressure and flow delivered to the remaining operating fluid devices in the system.

It is another object of the invention to provide a diverter valve having only one moving part, that part being a cock gate having a flow passage therein which is eccentrically disposed between the aligned inlet and outlet ports of the valve.

It is still another object of the present invention to provide a diverter valve wherein the flow of fluid through the valve is diverted from the outlet port to the bypass passage, without affecting the basic pressure within the fluid system.

It is a further object of the invention to provide a valve of this type wherein any number of diverter valves can be used in a closed fluid-pressure system, permitting each fluid device to be controlled by its diverter valve independently of all other fluid devices in the system.

It is still a further object of the invention to provide a valve of this character that is easy to service and maintain, and which requires no adjustments.

Still another object of the invention is to provide an apparatus of this character that is relatively inexpensive to manufacture.

It is still a further object of the invention to provide a diverter valve that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE INVENTION

Figure 1:
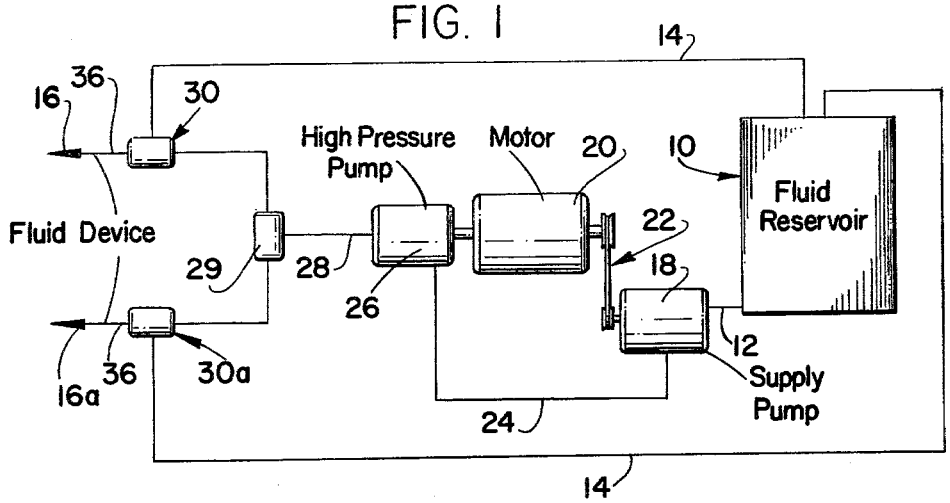
FIG. 1 is a diagrammatic view of a high-pressure fluid system including the present invention therein.
Figure 2:
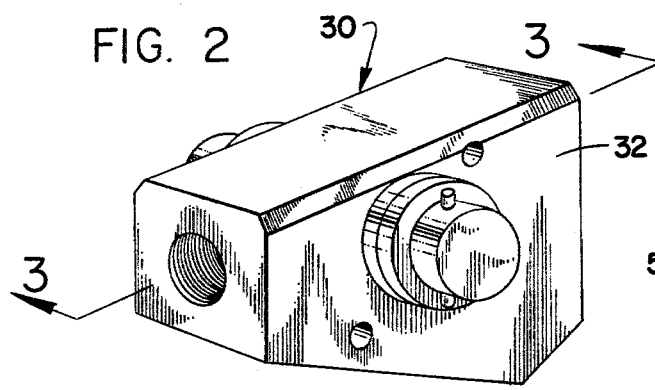
FIG. 2 is a perspective view of the diverter valve as disclosed herein.

Referring more particularly to FIG. 1, there is diagrammatically illustrated a high-pressure system arranged to pump fluid, such as water and the like, under high pressure through the system to at least two or more operating fluid devices.

As an example, the fluid device can be a fluid-discharge gun or similar device that is generally employed in a simple high-pressure system used for water blasting. Accordingly, the illustrated system of FIG. 1 includes a fluid reservoir, indicated at 10, having an outlet line 12 and inlet or return lines 14. The number of return lines depends on the number of fluid-discharge devices used with the system, wherein the devices are represented by arrowheads 16 and 16a, respectively.

Outlet line 12 is interconnected between reservoir 10 and a supply pump 18, pump 18 being operated by motor 20, herein shown as being driven by a typical belt-and-pully arrangement 22. Flow line 24 is interconnected between supply pump 18 to a high-pressure pump 26 which is also driven by motor 20, whereby pump 26 supplies fluid to the discharge devices 16 through line 28. From line 28, a manifold means 29 is provided so as to feed the plurality of devices 16, wherein each device is provided with an associated diverter valve, generally indicated at 30. Thus, discharge device 16 is associated with diverter valve 30, and device 16a is associated with valve 30a.

Figure 3:
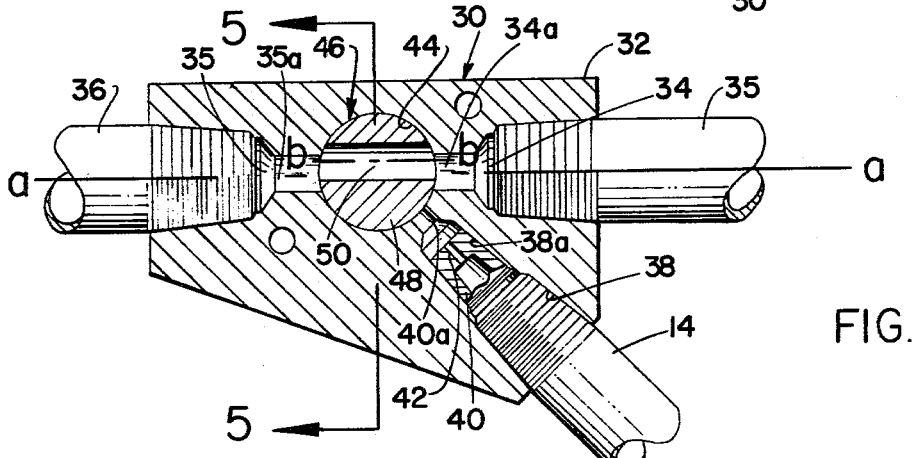
FIG. 3 is an enlarged cross-sectional view taken along line 3—3 of FIG. 2.
Figure 4:
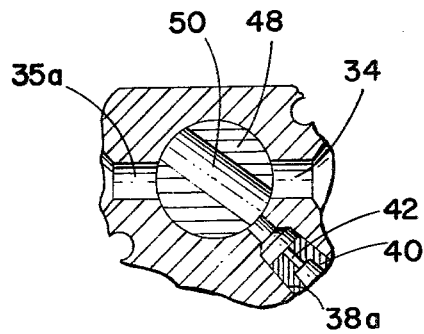
FIG. 4 is a cross-sectional view of the cock gate rotated to divert fluid flow through the bypass outlet.

Each diverter valve comprises a main body structure 32 having an inlet port 34 in which manifold line 35 is secured therein, the inlet port being further defined by passage 34a which is in axial alignment with passage 35a of outlet port 35—that is, inlet port 34 and outlet port 35 are concentrically disposed along longitudinal axis a—a, as seen in FIG. 3, outlet port 35 being adapted to receive discharge line 36 which connects valve 30 to its associated fluid device 16.

Figure 5:
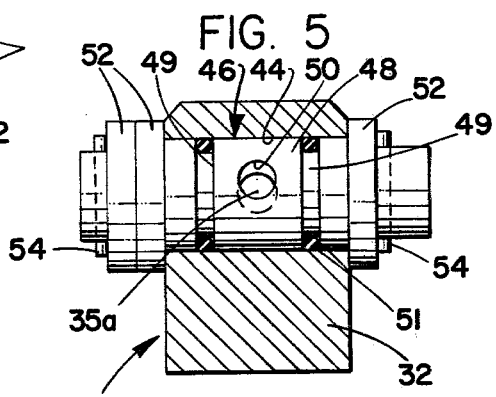
FIG. 5 is a cross-sectional view taken substantially along line 5—5 of FIG. 3 showing the cock gate in full lines.

Further included within body 32 is a third port defined as bypass port 38 having an inner reduced threaded bore 38a which is adapted to receive a metering means, one such means being a removably threaded plug member 40 having a predetermined size orifice 42. It should be additionally noted that bypass port 38 and plug 40 are angularly disposed forty-five degrees to the longitudinal axis of inlet port 34, wherein bypass port 38 is adapted at one end thereof to receive return-flow line 14 and the opposite inner end thereof is arranged to communicate with the transverse bore 44 formed intermediate inlet and outlet passages 34a and 35a, respectively, as seen in FIGS. 3 and 5.

Operably positioned within bore 44 is a flow-control means defined by a cock gate or stem, generally indicated at 46, wherein the stem is rotatable within bore 44 of body 32. Cock stem 46 comprises a central body member 48 having a transverse flow-control passage 50. When flow-control passage 50 is positioned in an open mode, as seen in FIG. 3, the longitudinal axis b—b of passage 50 is eccentrically positioned above axis a—a of inlet and outlet ports 34 and 35. The arrangement allows for uninterrupted flow through all the passages 34a, 35a and 50, wherein the attached discharge device receives the required pressure and volume flow.

Formed within body 48 and positioned on opposite sides of passage 50 are annular grooves 49 having "O"-rings 51 positioned therein to prevent leakage within bore 50. Each extended end of stem 46 is provided with reduced diameter members adapted to extend from both sides of body 32, whereby spacer members 52 are positioned thereon and held in place by pins 54, thus defining a means for mounting stem 46 to body 32.

Accordingly, as cock stem or gate 46 is rotated in bore 44 about an approximate forty-five degrees—passage 50 or stem 46 being eccentrically disposed—fluid is allowed to continuously flow between passage 34a and 35a during most of the rotation thereof.

That is, passage 50 is so positioned and provided with a specific diameter that the inlet end thereof adjacent passage 34a and orifice plug 40 will overlap passage 34a and passage 40a, while flow is still entering outlet passage 35a. Thus, by the time fluid flow is totally closed to passage 35a, pressure in the area of the cock stem is transferred into the return line 14. In order to establish a substantially equalized pressure within the system so as not to noticeably affect the overall system or the operation of each discharge device therein, the opening of orifice 42 is predetermined by the operating pressure drop provided by the valves associated with the fluid device 16. Thus, the orifice becomes an equalizing pressure means, during and after line 36 is closed down, thereby allowing fluid to return to reservoir 10 by way of bypass port 38 under a controlled condition.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A diverter-valve apparatus adapted to be operably positioned between a pump means within a high-pressure system and the working device operated by said system, the system having a reservoir, wherein said diverter valve comprises:

a main housing;

an inlet port longitudinally disposed in said body;

an outlet port longitudinally disposed in said body and oppositely positioned to said inlet port on a commonly aligned axis therewith;

a bore formed in said body transversely thereof, and interposed between said inlet and outlet ports, said ports communicating with said bore;

a bypass port formed in said body and angularly disposed relative to said inlet port, and communicating with said bore; and a flow-control means operably disposed in said bore of said body, wherein said means in an open mode allows fluid flow from said inlet port to said outlet, and wherein said means in a closed mode diverts fluid flow from said inlet port to said bypass port when said outlet port is closed thereby, said flow-control means comprising a cock-stem member rotatably disposed in said bore of said body, and a flow-control diverter passage having a longitudinal axis positioned in said cock stem so as to allow fluid flow between said inlet port and said outlet port, and to divert fluid flow from said inlet port to said bypass port without substantially affecting the pressure within said pressure system, said longitudinal axis of said flow-control passage, when in a communicating open position between said inlet and outlet ports, is eccentrically disposed to the axis of said inlet and outlet ports and in a parallel alignment therewith, and when said axis of said flow-control passage is rotated to a closed position one end of said passage is closed to prevent fluid flow to said working device, and the opposite end thereof is positioned to overlap said inlet port and said bypass port to divert fluid flow back to said reservoir within said system;

means within said bypass port for metering the flow of fluid therethrough and regulating the pressure thereof to simulate the pressure drop of said working device, wherein said metering means comprises a removable plug member having an orifice formed therein, the size of said orifice being determined by the pressure drop provided by its associated working device.

2. A diverter valve as recited in claim 1, wherein said flow-control means includes means for sealing said cock stem within said bore of said main body.

3. A diverter valve is recited in claim 2, wherein said cock stem includes means for mounting said stem in said bore and allowing rotational movement of said stem.

4. A diverter valve as recited in claim 1, wherein the angular displacement between said inlet port and said bypass port is forty-five degrees.

* * * * *